United States Patent [19]

Korb

[11] Patent Number: 5,024,026
[45] Date of Patent: Jun. 18, 1991

[54] SEGMENTAL GRINDING WHEEL

[75] Inventor: William B. Korb, Melrose, Conn.

[73] Assignee: American Saw & Mfg. Company, East Longmeadow, Mass.

[21] Appl. No.: 380,585

[22] Filed: Jul. 17, 1989

[51] Int. Cl.$^5$ ............................................. B24D 5/00
[52] U.S. Cl. .................. 51/206.4; 51/206 P; 76/37; 76/45
[58] Field of Search ............... 51/206 P, 206.4, 206.5, 51/206 R, 207, 268, 327, 98 BS, 98 HK, 98 SP; 76/25.1 R, 112, 37, 45

[56] References Cited

U.S. PATENT DOCUMENTS

| | | | |
|---|---|---|---|
| 11,937 | 10/1901 | Churchill | 51/206 R |
| 271,634 | 2/1883 | Hoffman | 76/45 |
| 2,885,912 | 5/1959 | Alber | 51/327 |
| 3,331,265 | 7/1967 | Kane | 76/25 R |
| 4,009,637 | 3/1977 | Bittner | 51/168 |
| 4,208,843 | 6/1980 | Amaki et al. | 51/207 |
| 4,434,685 | 3/1984 | Junker | 76/112 |

FOREIGN PATENT DOCUMENTS

| | | | |
|---|---|---|---|
| 3804247 | 6/1988 | Fed. Rep. of Germany | 76/37 |
| 2498969 | 8/1982 | France | 51/281 R |

*Primary Examiner*—Robert A. Rose
*Attorney, Agent, or Firm*—Chapin, Neal & Dempsey

[57] ABSTRACT

Segmental grinding wheel for forming the tip of intersecting surfaces on tools includes an array of peripherally extending and circumferentially, spaced segments. Each segment includes first and second grit-coated angularly oriented grinding surfaces. Another array includes similar grinding segments which are interdigitated in alternating sequence with the segments of the first array. The segments of the two arrays are concentric and partially coextensive in the axial direction of the wheel so that the plane of rotation of the first grinding surface of each segment in one array intersects the plane of rotation of the second grinding surface of an adjacent segment in the other array along a line which represents the tip of the intersecting surfaces.

2 Claims, 1 Drawing Sheet

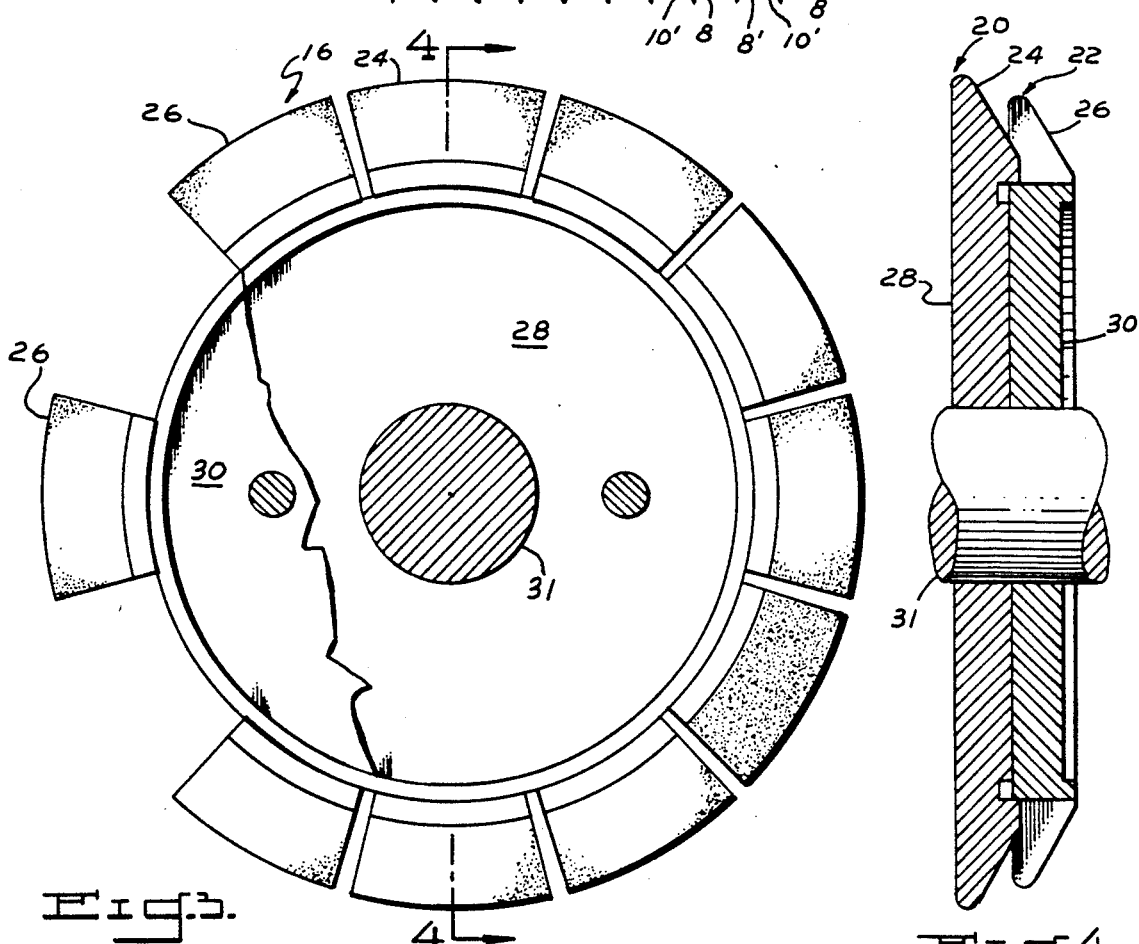

SEGMENTAL GRINDING WHEEL

BACKGROUND OF THE INVENTION

The present invention relates to a rotary grinding wheel for forming, in a single grinding step, sharply intersecting surfaces on tools, such as the teeth of a saw blade.

It has heretofore been the practive to form saw blade teeth in two separate grinding steps using a tool made up of axially spaced grinding wheels. On the first pass, the rake faces and relief surfaces of alternate teeth are ground. The grinding tool is then shifted laterally, or indexed, the pitch distance of the teeth being formed to make the second grinding pass, whereby relief surfaces and rake faces are again ground to complete each tooth. This procedure was necessary because no grinding wheels were available which could grind a truly sharp tip on each tooth in a single pass.

U.S. Pat. No. 4,208,843 to Amaki, et al, shows a grinding wheel for grinding smooth surfaces on fired porcelain bodies. The grinding wheel is formed from a plurality of axially and circumferentially spaced grinding pads mounted on equidistantly mounted grinding disks. The function of the spaced grinding pads is to reduce grinding resistance and grinding surface loading. The grinding pads of Amaki are thus not adapted for forming saw teeth, as is the main purpose of this invention.

The principal object of this invention is to provide a grinding wheel which will form, in a single grinding pass of the wheel over the work, one or more sharply cornered surfaces, such as the tips on the teeth of a saw blade.

The above and other objects and advantages of this invention will be more readily apparent from the following description read in conjunction with the accompanying drawings, in which:

FIG. 1 is an elevational view of the first step in the prior art method of forming a saw blade;

FIG. 2 is a view similar to FIG. 1 showing the second step of the prior art method;

FIG. 3 is a plan view of a segmental grinding wheel of the type embodying this invention;

FIG. 4 is a sectional view taken along line 4—4 of FIG. 3, and

FIG. 5 is an enlarged sectional view of a portion of FIG. 4, illustrating in detail two adjacent grinding segments.

Referring in detail to the drawings, in FIGS. 1 and 2, are shown the first and second stages of the prior art method of forming the teeth of a saw blade 6. The edge of a steel band 7 is impressed against the periphery of a grinding wheel (not shown) having one or more axially spaced grinding edges. Each grinding edge has an outer radius which conforms to the gullet shape 9 of the teeth and two angled surfaces which form the rake faces 8 and relief surfaces 10 of alternate teeth. The wheel is then moved laterally a distance equal to the pitch distance of the tooth pattern being formed and a second pass is made to form rake faces 8' and relief surfaces 10' whereby saw teeth 12 are formed with sharp tips defined by the points of intersection of the two separate grinding operations. Because of the particle size of the grit coating and core forming method, it is not feasible to have two grit-coated grinding surfaces intersect at a true point, since as a practical matter, a radiused tip invariably results. Thus, a two-step procedure was heretofore deemed necessary because no suitable tool was available which would form sharp, unradiused tips when, for example, the rake face and relief surface of the tooth are formed in one grinding pass.

This invention relates to a segmental grinding wheel 16 which is adapted to form one or more saw teeth in a single pass over the work. The invention would also have application in grinding the outside corners of a stepped drill, for example, where the axial and radial surfaces can be ground to a sharp corner in a single pass. The segmental grinding wheel comprises at least two coaxial arrays 20 and 22, each including peripherally extending, grit-coated, grinding segments 24 and 26. The segments 24 extend from a generally flat circular metal disc 28 in circumferentailly spaced relation. The arcuate spacing between adjacent segments, e.g., 32 degrees, is somewhat greater than the arcuate length of the segments, e.g., 28 degrees. Segments 26, identical to segments 24, extend from disc 30 and are disposed between the segments 24 in interdigitated relationship. Each pair of grinding segment arrays or discs will grind one tooth.

Dics 28 and 30 are secured together in surface-to-surface engagement on a drive shaft 31, as best illustrated in FIG. 4. The center portions of each disc has a smaller axial dimension than its peripheral segmented portion, whereby there is a substantial axial overlap a (FIG. 5) at the bases of the grinding segments of the two discs. While the grinding segments may vary in shape depending on the task to be performed, the segments, as depicted in FIGS. 4 and 5, each include an outer radiused portion 32 and 34 for forming the gullet of the saw tooth. First angularly oriented grinding surfaces 36 and 38 are adapted to form the rake faces of the teeth and angularly oriented grinding surfaces 42 and 44 are adapted to form the relief surfaces of the teeth. Each segment, including its radiused outer end and angled grinding surfaces, is coated with an extremely hard cubic boron nitride (CBN) or diamond grit coating, illustrated generally at 48. The geometry of the segments 24 and 26 and their axial overlap a are selected so that adjacent grinding surfaces 38 and surfaces 42 have a cross-over point 50 where the two grinding surfaces appear to intersect, in a plane perpendicular to the cutting plane, as depicted in FIG. 4. In other words, the grinding path or plane of rotation of surface 38 intersects the plane or rotation at a line represented as a point 50 in FIG. 5.

The shape of the several pairs of grinding surfaces 38 and 42 above the cross-over point 50 will determine the shape of the saw tooth. As will best be visualized by reference to FIG. 5, the multiple pairs of adjacent peripheral segments 24 and 26 will combine to form, in a single pass into the work, a saw tooth or other sharply angled point which has a shape defined by surfaces 38 and 42.

Grinding surfaces 38 and 42 of adjacent segments extend below the cross-over point 50 which ensures that each saw blade point or tip will be sharply finished. Since the rake face and relief surfaces of each tooth will be ground by circumferentially-spaced grinding surfaces 38 and 42 which extend well beyond cross-over point 50, a sharply tipped tooth will result. In addition, the overlap also permits placement of shims between the discs 28 and 30 such that the height of the saw teeth formed by the grinding wheel may be increased. In this manner, a single grinding wheel may be adjusted to form saw blades with different cutting teeth profiles. It will, of course, be recognized that it is within the scope of this invention to employ multiple pairs of grinding discs to grind a plurality of teeth in one pass.

As shown, each cutting disc is provided with an annular groove 52 which provides a passage cutting liquid used during the grinding operation.

The cutting wheel may be formed of any suitable material adapted for grit coating. A grit surface of an extremely hard particulate material, such as cubic boron nitride (CBN) or diamond grit, is surface plated or coated on the grinding surface of the wheel. When the grit surfaces of the wheel become worn, the wheel is not dressed" as is common in conventional grinding wheels, but the old coating is first stripped away and the wheel is resurfaced by recoating with another abrasive layer.

Having thus described my invention, what is claimed is:

1. A segmental rotary grinding wheel for forming saw teeth on the edge of a blade comprising at least one array of circumferentially-spaced grinding segments having first and second angularly oriented grinding surfaces, at least one other array of such grinding segments disposed in partially coextensive and fixed axial relationship with the angularly oriented grinding surfaces of adacent segments of the two arrays defining the configuration of a saw tooth, the first and second grinding surface of the segments, in each array, having generally the same surface area as the corresponding surface of the other segments in that array, each of said arrays of grinding segments extending from the periphery of a circular disc with the discs being disposed in abutting coaxial relation and the grinding segments of one disc interdigitated between the segments of the other disc.

2. A segmental rotary grinding wheel, as set forth in claim 1, in which each segment includes a radiused outer edge portion joining said first and second angularly oriented grinding surface, one surface adapted to form the rake face of a saw tooth and the other adapted to form the relief surface and the radiused portion corresponding to the gullet thereof, the grinding surfaces being grit coated surfaces.

* * * * *